Feb. 5, 1952 R. CRANE, JR., ET AL 2,584,259

INTEROFFICE TELEPHONE SYSTEM

Filed March 30, 1949 2 SHEETS—SHEET 1

Inventor
ROBERT CRANE JR.
GEORGE R. GAMERTSFELDER
By
H. L. Mackey
Attorney

INTEROFFICE TELEPHONE SYSTEM

Filed March 30, 1949 2 SHEETS—SHEET 2

Inventor
ROBERT CRANE JR.
GEORGE R. GAMERTSFELDER
By
D. L. Mackey
Attorney

Patented Feb. 5, 1952 2,584,259

UNITED STATES PATENT OFFICE 2,584,259

INTEROFFICE TELEPHONE SYSTEM

Robert Crane, Jr., Chappaqua, and George R. Gamertsfelder, Pleasantville, N. Y., assignors to General Precision Laboratory Incorporated, a corporation of New York Application March 30, 1949, Serial No. 84,304

9 Claims. (Cl. 179—15)

This invention relates to an inter-office telephone system of the carrier frequency type wherein a single pair of conductors or alternatively a single coaxial cable is sufficient to interconnect a considerable number of stations.

In any inter-office communication system in which a number of stations are provided it is essential that there be no restriction on the number of simultaneous conversations which may be had at any given time. To that end, the instant invention provides apparatus in which each station is assigned a particular carrier frequency and intelligence is conveyed between desired stations by modulating the assigned carrier frequencies with the desired audio frequency.

Another and particularly important purpose of the present invention is to provide a system wherein the communications between selected stations are made absolutely private and no opportunity is provided either by intention or inadvertence for a party to listen in on the conversation taking place between other parties.

This purpose is accomplished by providing each station with a receiving circuit tuned to a single fixed frequency so that no conversation can be heard unless it is directed to that station by being conveyed on the frequency channel assigned to that particular station. At the same time in order that each station may communicate with any other station, the transmitter at each station is arranged to be adjustable in frequency so that the transmitter frequency may be changed at will to correspond to the fixed receiving frequency of any desired station.

In general then, each station can receive only on a fixed frequency but may transmit on any of the frequencies which are assigned to the other stations. When one station desires to call another, the calling station switches his transmitter to the receiving frequency of the called station, an indication is given at the called station that a call is to be received and the called station answers by transmitting on the frequency assigned to the calling station for reception. The calling station is then transmitting on the frequency assigned to the called station for reception, while the called station transmits on the frequency assigned to the calling station for reception. All other stations having receivers which are tuned to other frequencies are incapable of receiving any part of the conversation but at the same time may converse over the same line on their own respective assigned frequencies.

As an important adjunct to the system of the present invention, apparatus is provided whereby an indication is had at the called station as to the identity of the calling station. This may take the form of an indication of identity alone requiring the called station to manually tune his transmitter to the frequency assigned to the calling station for reception or alternatively an automatic arrangement is provided whereby the transmitter of the called station is automatically tuned to the receiving frequency of the calling station by the placing of the call.

Frequently in an inter-office communication network of any extent, one station may place a call to another which is already engaged in conversation with a third party. One purpose of the present invention, therefore, is to provide a means whereby an indication is given at the calling station immediately that the transmitter of the calling station is tuned to the fixed frequency of the called station and before any transmission takes place, if the called station is busy. Thus any interruption or breaking in on an existing conversation is prevented.

The invention will be more clearly understood from the following detailed description when taken together with the accompanying drawings in which.

Figure 1:
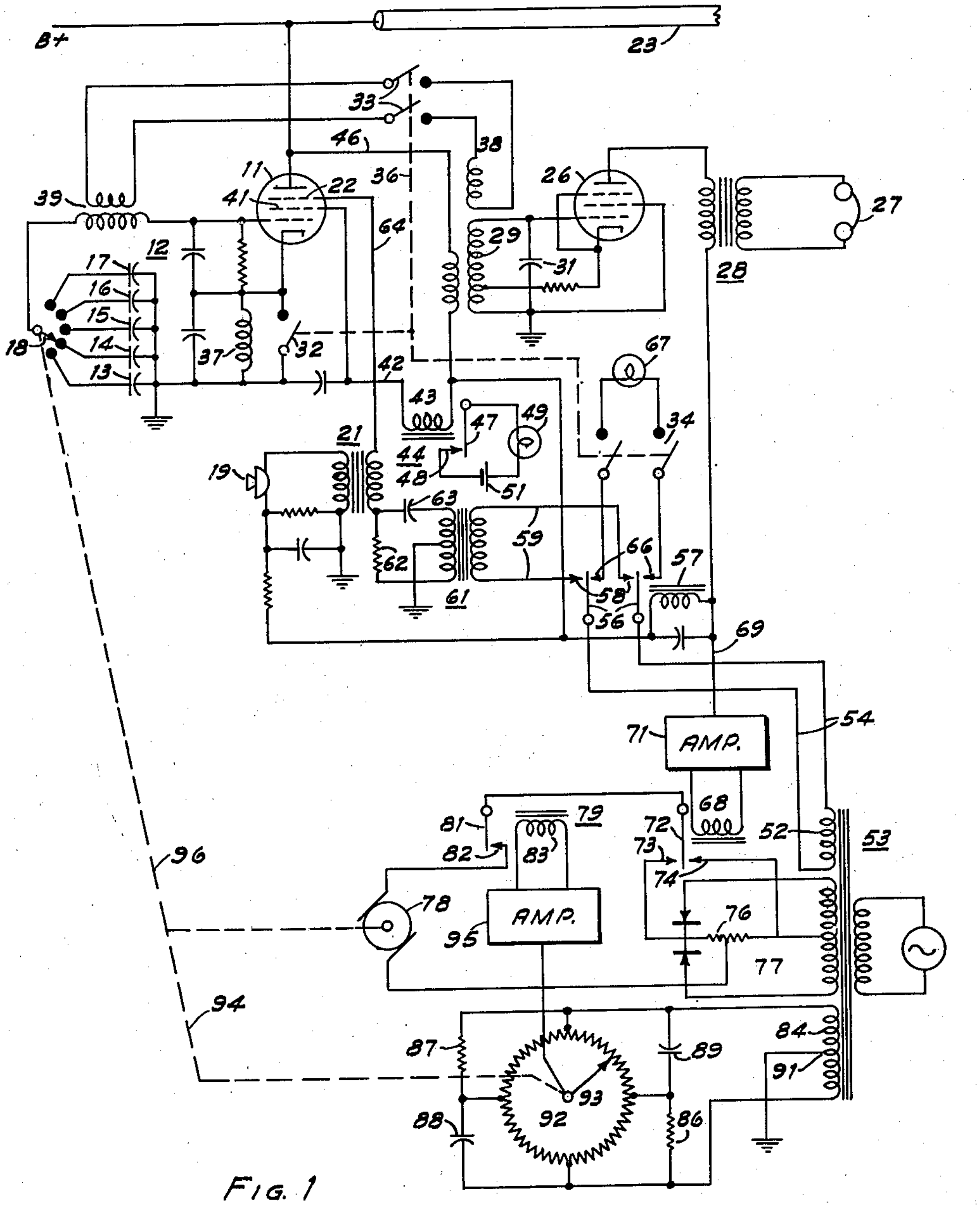
Figure 1 is a schematic diagram of one station of the invention incorporating means for indicating the identity of the calling station and for automatically tuning the transmitter to the receiving frequency of a calling station.

Referring now to Fig. 1, the transmitter comprises an electron-coupled oscillator consisting of the tube 11 having a tank circuit 12 tunable to selected frequencies by connecting a selected one of the condensers 13 to 17 inclusive, in circuit by operation of the selective switch 18. The carrier wave or high frequency oscillations produced by the oscillator 11 is modulated by the desired voice frequency signals which actuate a microphone 19 by being impressed on the suppressor grid 22 through a step-up transformer 21.

The amplitude modulated signals produced in this manner in the anode circuit of the tube 11 are transmitted over a single line, here illustrated as a coaxial cable 23. This single line may also act as the means for impressing the anode supply voltage from a single common power supply to the anode circuits of the various tubes employed at the several stations.

Received signals obtained from the single line 23, interconnecting all stations, are impressed on a regenerative detector 26 through the medium of a transformer 24. The detector 26 has its input fixedly tuned to a selected carrier frequency by a circuit consisting of the secondary 29 of the transformer 24 and the condenser 31 connected in shunt thereto. If a signal is impressed on the line 23 which has a carrier frequency corresponding to the frequency to which the receiving circuit is tuned, such signal is impressed on the input of the demodulator 26, demodulated thereby and the audio frequency signal so obtained impressed on a receiver 27 through the medium of a transformer 28. It will be appreciated of course, that the transmitter 19 and receiver 27 may both be incorporated in a single handset if desired.

Inasmuch as the input circuit of the detector 26 is fixedly tuned to a single carrier frequency and the tuning thereof cannot be altered, any signals of other carrier frequencies impressed on the common line 23 produce no response in the receiver 27 and unauthorized listening-in on existing conversations between other parties is prohibited.

In making a call, the calling station while leaving his handset in place, tunes his oscillator 11 to the receiving frequency of the station he desires to call. With the handset in its cradle, switches 32, 33 and 34 are all closed and all are conjointly operated by the removal of the handset from its cradle as indicated by the common mechanical connection 36. With switch 32 closed the choke 37 in the cathode circuit of tube 11 is shorted so that this tube is not oscillating and no signal is transmitted by the calling station prior to the lifting of the handset.

However, if the called station is busy, that is someone else is communicating therewith on its assigned frequency, there will be a signal on the line having a carrier frequency which is the same as that to which the transmitter has just been tuned. This signal will be impressed on the input of the tube 11 by a circuit which consists of the coil 38 coupled to the transformer 24, switch 33, now closed, and transformer 39. The imposition of this signal on the input of the tube 11 causes a change in the current in the screen grid circuit of this tube which circuit includes the screen grid 41, conductor 42, actuating coil 43 of a relay 44 and conductor 46 connected to the common source of anode potential supply carried by the cable 23. The change in current in this circuit results in the actuation of the relay 44 closing the contacts 47 and 48 and energizing an indicator here exemplified by a lamp 49 by a potential supply source diagrammatically indicated by a battery 51. Thus the mere tuning of the oscillator 11 to the frequency of the called station without lifting the handset from its cradle and without sending any signal to the line, produces an indication that the called station is busy, if such is the case.

If, however, the called station is not busy the calling station lifts his handset opening switches 32, 33 and 34 and the tube 11 produces oscillations of a frequency corresponding to the receiving frequency of the called station. Aside from voice modulations which may be introduced through the medium of the transmitter 19 this carrier frequency is also modulated by a 60-cycle wave obtained over a circuit which consists of a secondary winding 52 forming one of the windings of a power transformer 53, the conductors 54, movable contacts 56 of an alternating current relay 57, lower contacts 58, conductors 59, transformer 61, a phase shifting circuit consisting of a resistor 62 and condenser 63, conductor 64 and suppressor grid 22 of the tube 11. Thus even if no voice signals are introduced into the transmitter 19 the carrier wave now being transmitted over the line is modulated by an audio frequency signal.

This signal is impressed on the input circuit at the called station which is similar in all respects to the receiving circuit illustrated except as to the constants of the coil 29 and condenser 31. Since the signal being transmitted is of the frequency to which these elements are tuned, the signal is impressed on a detector 26, demodulated thereby and an audio frequency signal obtained in the anode circuit thereof which thus far consists of the phase shifted 60-cycle signal just described. This signal operates the alternating current relay 57 causing the movable contacts 56 to engage the upper contacts 66 of the relay 57 and since switch 34 is closed, the called station not having as yet removed its handset, energy is supplied to an indicating device 67, which may be a signal light, bell or other suitable mechanism, from the source 52.

By this means the called station is informed that it is being called. Before reply can be made, however, the called station must either have its transmitter tuned to the receiving frequency of the calling station automatically or must be informed what station is calling so that this operation may be performed manually just as has been heretofore described in connection with the placing of the call.

Apparatus which automatically tunes the transmitter of the called station to the fixed receiving frequency of the calling station is described in Fig. 1.

As heretofore stated the 60-cycle signal which modulated the transmitted carrier frequency of the calling station was caused to undergo a phase shift by the use of the circuit consisting of condenser 63 and resistor 62. At each station the values of these components are so selected that the 60-cycle signal rate produced by each station has a different phase and this difference in phase constitutes the identifying and tuning medium.

The 60-cycle phase signal aside from aiding in actuating the relay 57 also actuates a single-pole double throw relay 68, the signal transmitted over the conductor 69 being amplified by an amplifier 71 before being impressed on the relay 68 if desired. Since the signal impressed on the relay 68 is an alternating current signal the armature 72 is caused to alternately engage its fixed contacts 73 and 74 in synchronism with the alternations of the current impressed thereon.

The fixed contacts 73 and 74 are connected to the opposite ends of a resistor 76 which is supplied with a rectified source of potential by means of the rectifying circuit 77 connected to the power transformer 53. A motor 78 has one terminal connected to the midpoint of resistor 76 and its other terminal connected through the contacts 81 and 82 of a relay 79 to the movable contact 72. Thus assuming for the moment that the contacts 81 and 82 of the relay 79 are closed, potential is applied to the motor 78 in first one direction and then the other as the movable contact 72 alternately engages the contacts 73 and 74 under control of the alternating current flowing in the actuating coil 68.

The actuating coil 83 of the relay 79 is controlled by an alternating current whose phase is dependent on the position assumed by the motor 78. A 60-cycle current is derived from the power transformer 53 through a secondary 84 and this current is impressed on a phase shifting network consisting of resistors 86 and 87 and condensers 88 and 89 connected to form a bridge circuit across the secondary 84 whose midpoint is grounded at 91.

The values of the condensers 88 and 89 are chosen with respect to the values of the resistors 86 and 87 so as to satisfy the expression: $\omega RC=1$, where R is the resistance of resistor 86 and resistor 87 and C is the capacity of condenser 88 and condenser 89 and $\omega=2\pi\times 60$-cycles. Under these conditions the phase of the current at any one of the four junction points of the bridge circuit is displaced by 90° as respects any adjacent point and a phase shift of 360° is experienced in making a circuit of all of the junction points. These junction points are connected by a continuous potentiometer or other suitable device 92 having a uniform resistance about its circumference so that a progressive phase shift in current is obtained at each point about its periphery.

A movable contact 93 engages the potentiometer 92 and the phase of the current impressed thereon is dependent on the position of the contact 93 on the potentiometer 92, which in turn is controlled by the position of the motor 78 through the shaft 94. The current derived from the contact 93 is impressed on the actuating coil 83 of the alternating current relay 79 through the medium of an amplifier 95 if desired and the contacts 81 and 82 are closed in synchronism with the alternations of this current whose phase as heretofore stated depends on the position of the contact 93. Thus the circuit for energizing the motor 78 is alternately opened and closed at instants of time which depend on the phase of the current supplied to contact 93 and hence relay 79, while at the same time this circuit is alternately energized in opposite directions at instants of time which depend on the phase of the current supplied to relay 68 and hence the phase of the 60-cycle modulation signal transmitted from the calling station.

Figure 3:
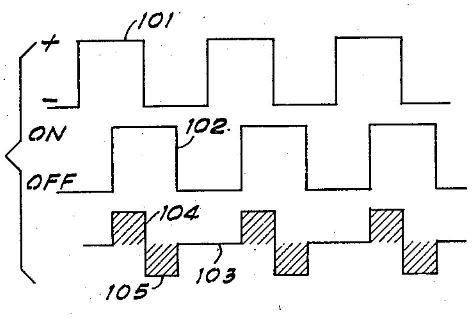
Figures 3 and 4 are graphs illustrating the principle of operation of the phase comparing mechanism incorporated in the system depicted in Fig. 1.
Figure 4:
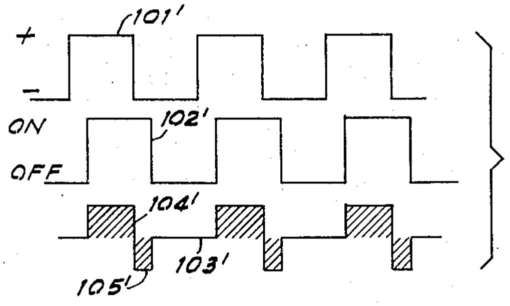

The phases of these two currents are compared and the comparison utilized to control the tuning of the transmitter frequency at the called station to that of the fixed receiving frequency of the calling station in a manner as can be more readily ascertained by reference to the curves of Figs. 3 and 4.

Referring first to Fig. 3 the curve 101 represents the alternate positive and negative potentials applied to the motor energization circuit by actuation of the relay 68 while curve 102 represents the alternate opening and closing of the switch contacts 81 and 82 through action of the relay 79. In order for potential to be applied to the motor 78, of course, the switch contacts 81 and 82 must be closed and this potential may be applied in a direction to cause the motor to operate either in a clockwise direction or counterclockwise direction depending on the position of the contact 72 during the time contacts 81 and 82 are closed. Curve 103 represents the torque applied to the motor 78 when the currents applied to relays 68 and 79 have the relative phase as indicated in curves 101 and 102 and it can be seen by reference to the shaded areas 104 and 105 that equal and opposite torques are impressed thereon. Under these conditions the motor tends to rotate in first one direction and then the other at alternate instants of time but since it has a certain amount of inertia the result of the application of equal and opposite torques is that the motor remains stationary.

Suppose, however, that some other phase relation exists between the currents in relays 68 and 79, as illustrated by curves 101′ and 102′ of Fig. 4. It will be then apparent from curve 103′ that a greater positive torque as indicated by the shaded area 104′ is applied to the motor than negative torque as indicated by the shaded area 105′ and the motor will start to revolve. In so doing, however, it rotates the contact 93 (Fig. 1) so that the phase of the current applied to relay 79 is changed and the circuit is adjusted so that this movement tends to establish the balanced conditions illustrated in Fig. 3. Of course, in re-establishing balance the motor 78 assumes a new angular position and through the shaft 96 connected between the motor 78 and the selector switch 18, the appropriate condenser 13, 14, 15, 16 or 17 is connected in circuit with the oscillator 11. Thus by suitable correlation, the amount of phase shift introduced by the condenser resistor combination 63 and 62 at any station in its characteristically phase shifted tone signal causes the transmitter at any called station to be automatically tuned to the fixed receiving frequency of the calling station and after the indicator signal 67 has indicated that the station is being called the called party need only lift his handset and begin the conversation.

Although a specific circuit consisting of the resistors 86 and 87, condensers 88 and 89 and potentiometer 92 has here been disclosed as a means for producing a current whose phase shift depends on the position of the motor 78, those skilled in the art will readily appreciate that other instrumentalities may be used with equal effect. For example, a resolver may be used having its fixed coils energized by the alternating current source and its movable coil actuated by the motor and constituting the source of phase shifted current. The circuit illustrated, however, is somewhat less expensive and hence is advantageous for that reason.

In place of the automatic tuning system just described whereby the called station's oscillatory transmitting circuit is tuned by the characteristic phase of the 60-cycle signal emitted by the calling station a mere indication of the identity of the calling station may be given at the called station leaving it to the called station to manually tune its transmitting circuit to the fixed receiving frequency of the calling station. Such a modification of the system is disclosed in Fig. 2 only those elements which are to be substituted in the circuit of Fig. 1 being illustrated for the sake of simplicity.

Figure 2:
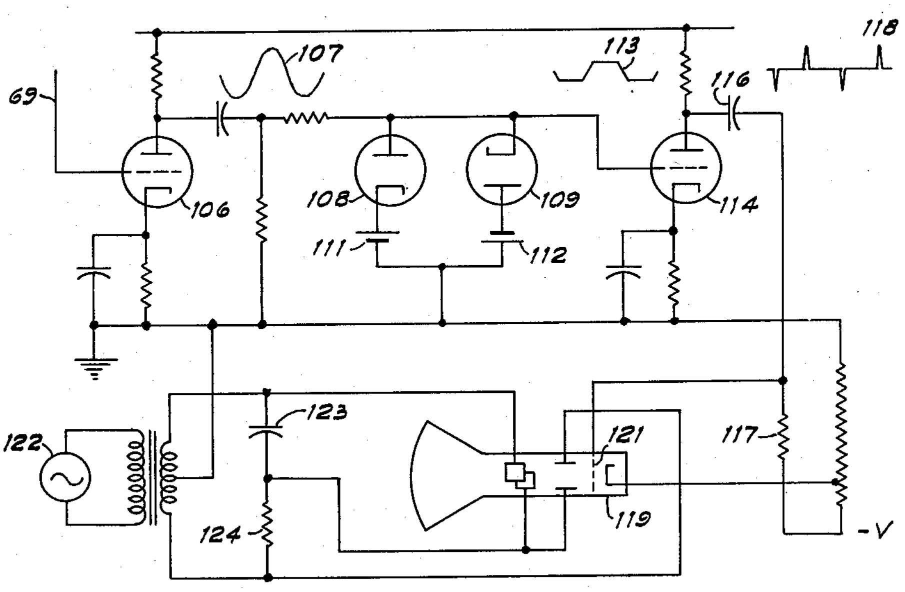
Figure 2 is a schematic diagram of a modified portion of the system of Fig. 1 wherein a visual means is provided for indicating the identity of the calling station, leaving it to the called station to manually tune its transmitter to the desired frequency.

Referring to Fig. 2 the conductor 69 is connected to the anode circuit of the demodulator in the same manner as is the conductor bearing the same reference character in Fig. 1. Thus the 60-cycle characteristically phase shifted signal transmitted by the calling station is impressed on the input of the amplifier 106, amplified thereby and an amplified sine wave signal is derived from the output thereof as indicated at 107.

This signal is impressed on a clipping circuit consisting of diodes 108 and 109 connected in opposition to each other and across the output of the amplifier 106. The cathode of the diode 108 is biased to a small positive potential by a source of potential indicated diagrammatically by the battery 111, while the anode of the diode 109 is similarly biased negatively by a battery 112. Thus the positive portion of the wave which exceeds the bias level of the source 111 is bypassed through the diode 108 while the negative portion of the wave whose amplitude exceeds the potential of the source 112 is bypassed through the diode 109. This results in a wave of the form disclosed at 113 in which the negative and positive peaks are eliminated.

This wave may be amplified by the amplifier 114 and the resultant amplified wave is impressed on a differentiating network consisting of a condenser 116 and resistor 117 whose values are such that their product multiplied by the frequency of the signal impressed thereon in radians is much less than unity. By this means a wave of the shape indicated at 118 is produced in which sharp impulses are produced at the time intervals that the initial sine wave crosses the zero axis.

This wave is impressed on the intensifying electrode of a small cathode ray tube 119 here indicated as the control grid 121. At the same time the deflecting electrodes are supplied from a 60-cycle alternating current source 122 through a phase shifting circuit consisting of a condenser 123 and resistor 124 so that the cathode ray beam is caused to trace a circular pattern on the face of the tube screen.

With such an arrangement the positive impulses of the wave 118 produce intensified spots of light on the face of the cathode ray tube screen at such a point around the circular trace pattern formed thereon as is determined by the relative phase of the wave impressed on the conductor 69. In other words, the spot of light will appear on the cathode ray tube screen at different points depending on which station is the calling station.

Indicia may then be supplied to the face of the cathode ray tube face if desired designating the various stations of the communication network and on receiving a call the called station need only note from this indication the identity of the calling station and adjust the tuning of his transmitting circuit to correspond thereto, thus answering the call.

What is claimed is:

1. An inter-communication system comprising, a plurality of stations interconnected by a single common communicating channel, a receiving circuit at each of said stations tuned to a single selected carrier wave signal frequency which differs for each of said stations, a transmitting circuit at each of said stations including means selectively tunable to any one of the carrier wave signal frequencies to which the receiving circuits of the remaining stations are tuned, means in each of said transmitting circuits for modulating a selected carrier wave signal frequency by an audio frequency, means in each of said receiving circuits for demodulating the carrier wave signal frequency for which said receiving circuit is tuned and means in said transmitting circuit actuated by said selectively tunable means for indicating whether a signal having a carrier wave signal frequency to which said selectively tunable means is adjusted is being impressed on said common communicating channel.

2. An inter-communication system comprising, a plurality of stations interconnected by a single common communicating channel, a receiving circuit at each of said stations tuned to a single selected carrier wave signal frequency which differs for each of said stations, an oscillator at each of said stations, means for selectively varying the signal frequency generated by an oscillator whereby signal frequencies generated thereby may be made to correspond to any one of the carrier wave signal frequencies to which the receiving circuits of the remaining stations are tuned, means connected in circuit with said oscillator and operative by said means for selectively varying the signal frequency of said oscillator for indicating prior to the generation of signals by said oscillator where a signal having a frequency corresponding to that to which said oscillator is adjusted is being impressed on said common communicating channel, means at each of said stations for producing a signal characteristic of that station, means for modulating the signal frequency generated by an oscillator at a station by the characteristic signal of that station, means in each of said receiving circuits for demodulating the carrier wave signal frequency to which said receiving circuit is tuned and means operative by a characteristic signal derived as a result of said demodulation for indicating the identity of the station transmitting the carrier wave signal frequency.

3. An inter-communication system comprising, a plurality of stations interconnected by a single common communicating channel, a receiving circuit at each of said stations tuned to a selected carrier wave signal frequency which differs for each of said stations, an oscillator at each of said stations, means for selectively varying the signal frequency generated by an oscillator whereby signal frequencies generated thereby may be made to correspond to any one of the carrier wave signal frequencies to which the receiving circuits of the remaining stations are tuned, said oscillator being normally inoperative, circuit means interconnecting said single communicating channel and said oscillator for producing a change in current flow therein by the adjustment of said means for selectively varying the signal frequency of said oscillator to the frequency of a signal which is present on said common communicating channel, indicating means operated by said change in current flow, means at each of said stations for producing a signal characteristic of that station, means for modulating the signal frequency generated by an oscillator at a station by the characteristic signal of that station, means in each of said receiving circuits for demodulating the carrier wave signal frequency to which said receiving circuit is tuned and means operative by a characteristic signal derived as a result of demodulation for automatically adjusting the signal frequency generated by an oscillator at a called station to correspond to the carrier wave signal frequency to which the receiving circuit of a calling station emitting the characteristic signal is tuned.

4. An inter-communication system comprising, a plurality of stations interconnected by a single common communicating channel, a receiving circuit at each of said stations tuned to a single selected carrier wave signal frequency which differs for each of said stations, an oscillator at each of said stations, means for selectively varying the signal frequency generated by an oscillator whereby signal frequencies generated thereby may be made to correspond to any one of the carrier wave signal frequencies to which the receiving circuits of the remaining stations are tuned, means at each of said stations for producing a signal characteristic of that station, means for modulating the signal generated by an oscillator at a station by the characteristic signal of that station, means in each of said receiving circuits for demodulating the carrier wave signal frequency to which said receiving circuit is tuned, means operative by a characteristic signal for indicating the identity of the station transmitting said signal and means connected in circuit with the oscillator at each of said stations and operative by said means for selectively varying the signal frequency of said oscillator for indicating whether a signal having a frequency to which the oscillator is adjusted is being impressed on said common communicating channel.

5. An inter-communication system comprising, a plurality of stations interconnected by a single common communicating channel, a receiving circuit at each of said stations tuned to a selected carrier wave signal frequency which differs for each of said stations, an oscillator at each of said stations, means for selectively varying the signal frequency generated by an oscillator whereby signal frequencies generated thereby may be made to correspond to any one of the carrier wave signal frequencies to which the necessary circuits of the remaining stations are tuned, means at each of said stations for producing a signal characteristic of that station, means for modulating the signal frequency generated by an oscillator at a station by the characteristic signal of that station, means in each of said receiving circuits for demodulating the carrier wave signal frequency to which said receiving circuit is tuned, means operative by a characteristic signal derived as a result of demodulation for automatically adjusting the signal generated by an oscillator at a called station to correspond to the carrier wave signal frequency to which the receiving circuit of a calling station emitting the characteristic signal is tuned and means connected in circuit with the oscillator at each of said stations and operative by said means for selectively varying the signal frequency of said oscillator for indicating prior to the emission of a signal thereby whether a signal having the frequency to which the receiving circuit of a called station is tuned is being impressed on said common communicating channel.

6. An inter-communication system comprising, a plurality of stations interconnected by a single common communicating channel, a receiving circuit at each of said stations tuned to a selected carrier wave signal frequency which differs for each of said stations, an oscillator at each of said stations, means for selectively varying the signal frequency generated by an oscillator whereby the signal frequencies generated thereby may be made to correspond to any one of the carrier wave signal frequencies to which the receiving circuits of the remaining stations are tuned, said oscillator being normally inoperative, circuit means interconnecting said single communicating channel and said oscillator for producing a change in current flow therein by the adjustment of said means for selectively varying the signal frequency of said oscillator to the frequency of a signal which is present on said common communicating channel, indicating means operated by said change in current flow, a source of alternating current signals at each of said stations, a phase shifting circuit at each of said stations for shifting the phase of said alternating current signals by an amount which is different at each of said stations, means for modulating the signal frequency generated by an oscillator at a station by the characteristically phase shifted alternating current signal of that station, means in each of said receiving circuits for demodulating the carrier wave signal frequency to which said receiving circuit is tuned and means operative by a characteristically phase shifted signal derived as a result of said demodulation for indicating the identity of the station transmitting the carrier wave signal frequency.

7. An inter-communication system comprising, a plurality of stations interconnected by a single common communicating channel, a receiving circuit at each of said stations tuned to a selected carrier wave signal frequency which differs for each of said stations, an oscillator at each of said stations, means for selectively varying the signal frequency generated by an oscillator whereby the signal frequencies generated thereby may be made to correspond to any one of the carrier wave signal frequencies to which the receiving circuits of the remaining stations are tuned, said oscillator being normally inoperative, circuit means interconnecting said single communicating channel and said oscillator for producing a change in current flow therein by the adjustment of said means for selectively varying the signal frequency of said oscillator to the frequency of a signal which is present on said common communicating channel, indicating means operated by said change in current flow, a source of alternating current signals at each of said stations, a phase shifting circuit at each of said stations for shifting the phase of said alternating current signals by an amount which is different at each of said stations, means for modulating the signal frequency generated by an oscillator at a station by the characteristically phase shifted alternating current signal of that station, means in each of said receiving circuits for demodulating the carrier wave signal frequency to which said receiving circuit is tuned and means operative by a characteristically phase shifted signal derived as a result of demodulation for automatically adjusting the signal frequency generated by the oscillator at a called station to correspond to the carrier wave signal frequency to which the receiving circuit of a calling station emitting the characteristically phase shifted signal is tuned.

8. An inter-communication system comprising, a plurality of stations interconnected by a single common communicating channel, a receiving circuit at each of said stations tuned to a selected carrier wave signal frequency which differs for each of said stations, an oscillator at each of said stations, means for selectively varying the signal frequency generated by an oscillator whereby the signal frequencies generated thereby may be made to correspond to any one of the carrier wave signal frequencies to which the receiving circuits of the remaining stations are tuned, a source of alternating current signals at each of said stations, a phase shifting circuit at each of said stations for shifting the phase of said alternating current signals by an amount which is different at each of said stations, means for modulating the signal frequency generated by an oscillator at a station by the characteristically phase shifted alternating current signal of that station, means in each of said receiving circuits for demodulating the carrier wave signal frequency to which said receiving circuit is tuned, means operative by a characteristically phase shifted signal derived as a result of said demodulation for indicating the identity of the station transmitting the carrier wave signal frequency and means connected in circuit with the oscillator at each of said stations and operative by said means for selectively varying the signal frequency of said oscillator for indicating whether a signal having a frequency to which the oscillator is adjusted is being impressed on said common communicating channel.

9. An inter-communication system comprising, a plurality of stations interconnected by a single common communicating channel, a receiving circuit at each of said stations tuned to a selected carrier wave signal frequency which differs for each of said stations, an oscillator at each of said stations, means for selectively varying the signal frequencies generated by an oscillator whereby the signal frequencies generated thereby may be made to correspond to any one of the carrier wave signal frequencies to which the receiving circuits of the remaining stations are tuned, a source of alternating current signals at each of said stations, a phase shifting circuit at each of said stations for shifting the phase of said alternating current signals by an amount which is different at each of said stations, means for modulating the signal frequency generated by an oscillator at a station by the characteristically phase shifted alternating current signal of that station, means in each of said receiving circuits for demodulating the carrier wave signal frequency to which said receiving circuit is tuned, means operative by a characteristically phase shifted signal derived as a result of demodulation for automatically adjusting the signal frequency generated by the oscillator at a called station to correspond to the carrier wave signal frequency to which the receiving circuit of a calling station emitting the characteristically phase shifted signal is tuned and means connected in circuit with the oscillator at each of said stations and operative by said means for selectively varying the signal frequency of said oscillator for indicating prior to the emission of a signal thereby whether a signal having the frequency to which the receiving circuit of a called station is tuned is being impressed on said common communicating channel.

ROBERT CRANE, Jr.
GEORGE R. GAMERTSFELDER.

REFERENCES CITED

The following references are of record in the file of this patent:

UNITED STATES PATENTS

| Number | Name | Date |
|---|---|---|
| 980,357 | Squier | Jan. 3, 1911 |
| 1,542,121 | Williams | June 16, 1925 |
| 1,568,194 | Smythe | Jan. 5, 1926 |
| 1,632,078 | Jammer | June 14, 1927 |
| 1,684,455 | Nyquist | Sept. 18, 1928 |
| 1,898,118 | Demarest | Feb. 21, 1933 |
| 2,084,903 | Frink | June 22, 1937 |
| 2,107,168 | Tidd | Feb. 1, 1938 |
| 2,143,563 | Levy | Jan. 10, 1939 |
| 2,144,380 | Parker | Jan. 17, 1939 |
| 2,221,994 | Parker | Nov. 19, 1940 |
| 2,252,766 | Holden | Aug. 19, 1941 |
| 2,387,671 | Lundstrom | Oct. 23, 1945 |
| 2,408,085 | Meacham | Sept. 24, 1946 |
| 2,408,462 | Wise | Oct. 1, 1946 |
| 2,424,585 | Simon et al. | July 29, 1947 |
| 2,485,580 | Ferrar | Oct. 25, 1949 |